US011186041B2

(12) United States Patent
Tomioka

(10) Patent No.: US 11,186,041 B2
(45) Date of Patent: Nov. 30, 2021

(54) OPTICALLY SHAPING APPARATUS AND MANUFACTURING METHOD

(71) Applicant: CANON KABUSHIKI KAISHA, Tokyo (JP)

(72) Inventor: Yuichi Tomioka, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 289 days.

(21) Appl. No.: 16/364,319

(22) Filed: Mar. 26, 2019

(65) Prior Publication Data
US 2019/0217540 A1 Jul. 18, 2019

Related U.S. Application Data

(63) Continuation of application No. PCT/JP2017/034183, filed on Sep. 22, 2017.

(30) Foreign Application Priority Data

Sep. 29, 2016 (JP) .............................. JP2016-191240

(51) Int. Cl.
B29C 64/277 (2017.01)
B29C 67/00 (2017.01)
(Continued)

(52) U.S. Cl.
CPC ............ *B29C 64/277* (2017.08); *B29C 67/00* (2013.01); *B29C 67/0011* (2013.01);
(Continued)

(58) Field of Classification Search
CPC ... B29C 64/277; B29C 67/0011; B33Y 10/00; B33Y 30/00; B33Y 50/02
See application file for complete search history.

(56) References Cited

U.S. PATENT DOCUMENTS 4,945,032 A 7/1990 Murphy
5,175,077 A 12/1992 Grossa
(Continued)

FOREIGN PATENT DOCUMENTS

CN 103737929 A 4/2014
JP H01228828 A 9/1989
(Continued)

OTHER PUBLICATIONS

Office Action issued in U.S. Appl. No. 16/299,533 dated Jun. 19, 2020.
(Continued)

*Primary Examiner* — Yung-Sheng M Tsui
(74) *Attorney, Agent, or Firm* — Rossi, Kimms & McDowell LLP

(57) ABSTRACT

An optically shaping apparatus includes a light modulation element having a plurality of pixels and configured to modulate light from a light source for each pixel, an optical system configured to irradiate modulation light from the light modulation element onto the photocurable resin through the light-transmissive portion, a controller configured to control the light modulation element based on each of a plurality of two-dimensional shape data corresponding to a plurality of sections in a three-dimensional object, and a moving member configured to move a cured portion cured by the modulation light among the photocurable resin in a direction separating from the light-transmissive portion. The controller controls an irradiation timing of the modulation light onto the photocurable resin for each pixel to form the cured portion corresponding to the same section in the three-dimensional object, in accordance with information on a shape of the light-transmissive portion.

13 Claims, 9 Drawing Sheets

(51) Int. Cl.
*B33Y 50/02* (2015.01)
*B33Y 30/00* (2015.01)
*B33Y 10/00* (2015.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,902,537 | A | 5/1999 | Almquist |
| 7,014,988 | B2 | 3/2006 | DeVoe |
| 7,670,541 | B2 | 3/2010 | Kuzusako |
| 8,142,179 | B2 | 3/2012 | Kihara et al. |
| 9,529,371 | B2 | 12/2016 | Nakamura |
| 9,931,828 | B2 | 4/2018 | Kobayashi |
| 10,618,270 | B2 | 4/2020 | Knecht |
| 10,639,843 | B2 | 5/2020 | Yuan |
| 2003/0033128 | A1 | 2/2003 | Nagano et al. |
| 2006/0078831 | A1 | 4/2006 | DeVoe |
| 2009/0140172 | A1 | 6/2009 | Kihara et al. |
| 2009/0140466 | A1 | 6/2009 | Kuzasako |
| 2010/0027956 | A1 | 2/2010 | DeVoe |
| 2010/0125356 | A1 | 5/2010 | Shkolnik |
| 2013/0221551 | A1 | 8/2013 | Genda |
| 2014/0107823 | A1 | 4/2014 | Huang |
| 2015/0088292 | A1 | 3/2015 | Inoue |
| 2015/0277146 | A1 | 10/2015 | Crespo Vazquez |
| 2016/0046072 | A1* | 2/2016 | Rolland ............... B33Y 10/00 264/401 |
| 2016/0167160 | A1 | 6/2016 | Hellestam |
| 2017/0182708 | A1 | 6/2017 | Lin |
| 2018/0065302 | A1 | 3/2018 | Arai |
| 2018/0264735 | A1 | 9/2018 | Vilajosana |
| 2019/0210285 | A1 | 7/2019 | Tomioka |
| 2019/0210292 | A1 | 7/2019 | Tomioka |
| 2019/0212572 | A1 | 7/2019 | Tomioka |
| 2019/0371642 | A1 | 12/2019 | Iwai et al. |

FOREIGN PATENT DOCUMENTS

| | | | |
|---|---|---|---|
| JP | H0231727 U | 2/1990 | |
| JP | H04099618 A | 3/1992 | |
| JP | H04232728 A | 8/1992 | |
| JP | H04301431 A | 10/1992 | |
| JP | H06270266 A | 9/1994 | |
| JP | H08142203 A | 6/1996 | |
| JP | H09076353 A | 3/1997 | |
| JP | H09277384 A | 10/1997 | |
| JP | H10180881 A | 7/1998 | |
| JP | H10513130 A | 12/1998 | |
| JP | 3173212 B2 | 6/2001 | |
| JP | 2002331591 A | 11/2002 | |
| JP | 2002331591 A * | 11/2002 | ............. B33Y 50/02 |
| JP | 2003507223 A | 2/2003 | |
| JP | 2003345030 A | 12/2003 | |
| JP | 2005131938 A | 5/2005 | |
| JP | 3782049 B2 | 6/2006 | |
| JP | 2007111989 A | 5/2007 | |
| JP | 2009113294 A | 5/2009 | |
| JP | 2009132126 A | 6/2009 | |
| JP | 2009132127 A | 6/2009 | |
| JP | 2009132127 A * | 6/2009 | ........... B29C 64/135 |
| JP | 2009137048 A * | 6/2009 | ........... B29C 64/135 |
| JP | 2009137048 A | 6/2009 | |
| JP | 4499538 B2 | 7/2010 | |
| JP | 5023975 B2 | 9/2012 | |
| JP | 5082537 B2 | 11/2012 | |
| JP | 2015016610 A | 1/2015 | |
| JP | 2015030199 A | 2/2015 | |
| JP | 2015058678 A | 3/2015 | |
| JP | 2016087866 A | 5/2016 | |
| JP | 2018503536 A | 2/2018 | |
| MX | 2014012717 A | 4/2016 | |
| WO | 9623647 A2 | 8/1996 | |
| WO | 0114125 A1 | 3/2001 | |

OTHER PUBLICATIONS

Office Action issued in U.S. Appl. No. 16/354,657 dated Jul. 1, 2020.
Office Action issued in Japanese Application No. 2016-191240 dated Jul. 21, 2020. English translation provided.
Office Action issued in Japanese Application No. 2016-191241 dated Jul. 21, 2020. English translation provided.
International Search Report issued in Intl. Appln. No. PCT/JP2017/034180 dated Oct. 24, 2017. English translation provided.
Written Opinion issued in Intl. Appln. No. PCT/JP2017/034180 dated Oct. 24, 2017. English translation provided.
International Preliminary Report on Patentability issued in Intl. Appln. No. PCT/JP2017/034180 dated Apr. 11, 2019. English translation provided.
International Search Report issued in Intl. Appln. No. PCT/JP2017/034190 dated Dec. 19, 2017. English translation provided.
Written Opinion issued in Intl. Appln. No. PCT/JP2017/034190 dated Dec. 19, 2017. English translation provided.
International Preliminary Report on Patentability issued in Intl. Appln. No. PCT/JP2017/034190 dated Apr. 11, 2019. English translation provided.
International Search Report issued in Intl. Appln. No. PCT/JP2017/034198 dated Nov. 28, 2017. English translation provided.
Written Opinion issued in Intl. Appln. No. PCT/JP2017/034198 dated Nov. 28, 2017. English translation provided.
International Preliminary Report on Patentability issued in Intl. Appln. No. PCT/JP2017/034198 dated Apr. 11, 2019. English translation provided.
Office Action issued in U.S. Appl. No. 16/299,324 dated May 28, 2020.
Office Action issued in Chinese Appln. No. 201780059330.X dated Sep. 22, 2020. English translation provided.
Notice of Allowance issued in U.S. Appl. No. 16/354,657 dated Oct. 21, 2020.
International Search Report issued in Intl. Appln. No. PCT/JP2017/034183 dated Oct. 31, 2017. English translation provided.
Written Opinion issued in Intl. Appln. No. PCT/JP2017/034183 dated Oct. 31, 2017.
English translation of Written Opinion issued in Intl. Appln. No. PCT/JP2017/034183 dated Oct. 31, 2017, previously cited in IDS filed Mar. 26, 2019.
International Preliminary Report on Patentability issued in Intl. Appln. No. PCT/JP2017/034183 dated Apr. 11, 2019. English translation provided.
Office Action issued in Japanese Appln. No. 2016-191582 dated Sep. 1, 2020. English machine translation provided.
Office Action issued in U.S. Appl. No. 16/299,324 dated Nov. 17, 2020.
Office Action issued in U.S. Appl. No. 16/299,324 dated Jul. 14, 2021.

* cited by examiner

OPTICALLY SHAPING APPARATUS AND MANUFACTURING METHOD

CROSS-REFERENCE TO RELATED APPLICATIONS

This application is a Continuation of International Patent Application No. PCT/JP2017/034183, filed Sep. 22, 2017, which claims the benefit of Japanese Patent Application No. 2016-191240, filed Sep. 29, 2016, both of which are hereby incorporated by reference herein in their entirety.

BACKGROUND OF THE INVENTION

Field of the Invention

The present invention relates to a technology for curing a photocurable resin and for shaping a three-dimensional object.

Description of the Related Art

The three-dimensional shaping generates two-dimensional shape data (image data) for each position in a height direction from three-dimensional shape data representing a shape of a three-dimensional object, sequentially forms and laminates a shaped layer having a shape corresponding to each of sectional shape data, and obtains a three-dimensional object (a shaped object). As one three-dimensionally shaping method of this type, Japanese Patent Laid-Open No. ("JP") 2015-016610 discloses a method using a photocurable resin.

More specifically, a bottom surface of a container storing a liquid photocurable resin is formed of a light transmitting plate, and the photocurable resin is cured by the light irradiated from a bottom side of the light transmitting plate through the light transmitting plate. At this time, a single shaped layer is wholly and simultaneously cured by collectively projecting (irradiating) light modulated according to the sectional shape data through a light modulation element having a plurality of two-dimensionally arrayed pixels. Then, a three-dimensional object can be shaped by repeating the step of upwardly moving the cured shaped layer to form the next shaped layer.

This method can make the time required for shaping shorter than that of a method for sequentially curing the photocurable resin by scanning each laser beam (spot) for each shaped layer.

However, the three-dimensionally shaping method disclosed in JP 2015-016610 causes the light transmitting plate to deflect due to environmental fluctuations, the weight of the photocurable resin stored in the container, the self-weight of the light transmitting plate, and the like. Since the shaped layer is cured at a predetermined height position along the light transmitting plate in the container, the deflection of the light transmitting plate deforms the shaped layer to be formed as a flat surface and does not hinder the good shaping accuracy.

SUMMARY OF THE INVENTION

The present invention provides an optically shaping apparatus and the like which can obtain good shaping accuracy even when a deflection occurs in a light transmitting plate (light-transmissive portion or light transmitter) or the like.

An optically shaping apparatus according to one aspect of the present invention includes a container having a light-transmissive portion and configured to store a liquid photocurable resin, a light modulation element having a plurality of pixels and configured to modulate light from a light source for each pixel, an optical system configured to irradiate modulation light from the light modulation element onto the photocurable resin through the light-transmissive portion, a controller configured to control the light modulation element based on each of a plurality of two-dimensional shape data corresponding to a plurality of sections in a three-dimensional object, and a moving member configured to move a cured portion cured by the modulation light among the photocurable resin in a direction separating from the light-transmissive portion. The controller controls an irradiation timing of the modulation light onto the photocurable resin for each pixel so as to form the cured portion corresponding to the same section in the three-dimensional object, in accordance with information on a shape of the light-transmissive portion. Alternatively, the controller controls an irradiation timing of the modulation light onto the photocurable resin for each pixel so as to form the cured portion corresponding to on the same section in the three-dimensional object, in accordance with information on a shape of the cured portion formed by controlling the light modulation element based on a plurality of calibration two-dimensional shape data.

A manufacturing method according to another aspect of the present invention configured to manufacture a three-dimensional object includes the steps of storing a liquid photocurable resin in a container having a light-transmissive portion, irradiating modulation light from a light modulation element through the light-transmissive portion by controlling the light modulation element based on each of two-dimensional shape data corresponding to a plurality of sections in a three-dimensional object, the light modulation element having a plurality of pixels and being configured to modulate light from a light source for each pixel, moving a cured portion cured by the modulation light among the photocurable resin in a direction separating from the light-transmissive portion, and controlling an irradiation timing of the modulation light onto the photocurable resin for each pixel based on information on a shape of the light-transmissive portion so as to form the cured portion corresponding to the same section in the three-dimensional object.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
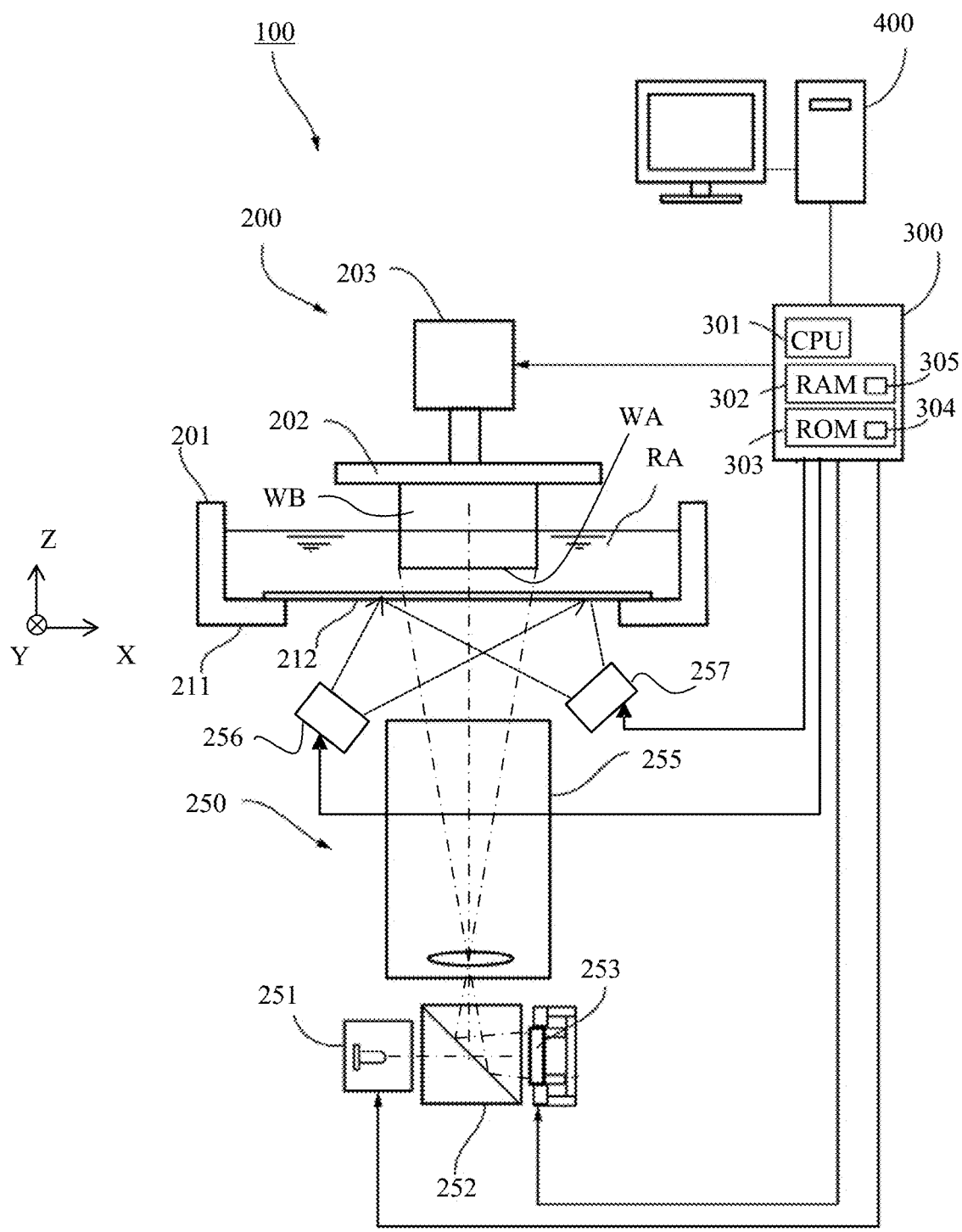
FIG. 1 is a view illustrating a configuration of a three-dimensionally shaping apparatus according to a first embodiment of the present invention.

FIG. 1 illustrates a configuration of a three-dimensionally shaping apparatus (optically shaping apparatus) according to a first embodiment of the present invention. A three-dimensionally shaping apparatus 100 forms a three-dimensionally shaped object by sequentially laminating shaped layers formed through irradiating and curing of a liquid photocurable resin with image light described later. This embodiment will illustratively describe image light as ultraviolet light (referred to as UV light hereinafter) and the ultraviolet curable resin (referred to as UV curable resin hereinafter) used as the photocurable resin. However, the image light other than the UV light and the photocurable resin other than the UV curable resin may be used.

The three-dimensionally shaping apparatus 100 includes a shaping unit 200 and a controller 300 for controlling the shaping unit 200. An image processing apparatus 400 as an external computer is connected to the controller 300.

The shaping unit 200 includes a container 201, a holding plate 202 as a moving member, a moving mechanism 203, and a projection unit 250. The container 201 includes a tank for storing a liquid UV curable resin RA, and has an opening in an upper portion. The container 201 includes a container body 211 and a light transmitting plate (light-transmissive portion or light transmitter) 212 having a light transmission property so as to close the opening formed on the bottom surface of the container body 211. The UV curable resin RA has a curing characteristic when receiving the UV light of a predetermined light amount or more. Hence, irradiating the UV light having a predetermined light amount or more only to a region to be cured can form the shaped object WB having an intended shape.

The light transmitting plate 212 has the UV/oxygen transmitting characteristic that transmits the UV light and oxygen. A thin fluoro-resin plate such as Teflon (registered trademark) AF2400 can be used for this light transmitting plate 212. The light transmitting plate 212 transmits oxygen in air and forms an oxygen-rich atmosphere at the interface with the UV-curable resin RA, thereby preventing the UV curable resin RA from being cured by the UV light (radical polymerization reaction). In other words, the UV curable resin RA is characterized in being curable by the UV light, and prevented from being cured in the oxygen-rich environment.

Figure 8A:
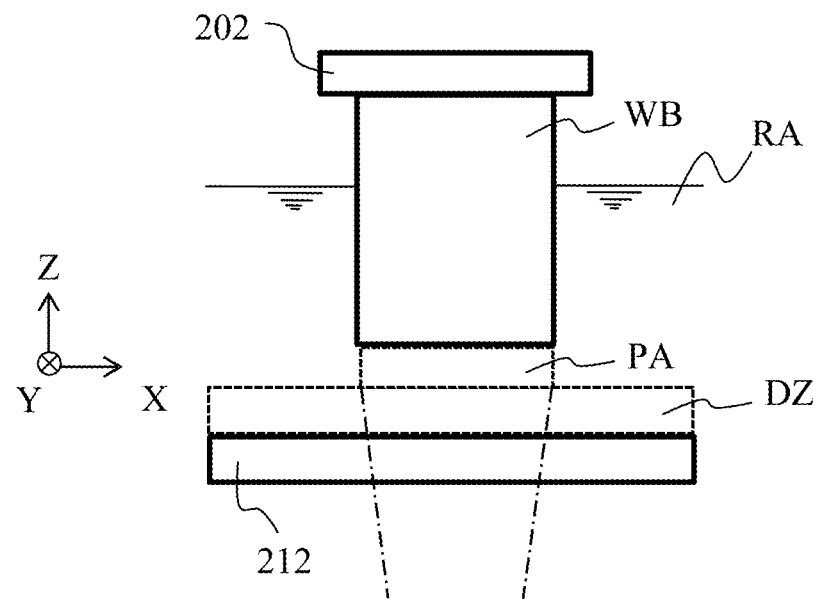
FIGS. 8A and 8B are views illustrating a flat light-transmissive portion and a deflecting light-transmissive portion.

Therefore, as illustrated in FIG. 8A, a dead zone (dead band) DZ in which the UV curable resin RA is not cured even under the UV light is formed in a layer shape near the light transmitting plate 212. Then, a layered portion (referred to as a shaped resin liquid layer hereinafter) located just above the dead zone DZ of the UV curable resin RA is cured by the UV light (image light), thereby forming a shaped layer (intermediate in course of shaping) WA. Thereby, the shaped layer WA never adheres to the light transmitting plate 212.

Oxygen that permeates the light transmitting plate 212 may use oxygen in air as described above, or an unillustrated oxygen supply unit (nozzle) may be disposed near the light transmitting plate 212 to supply oxygen to the light transmitting plate 212. The shaping unit 200 or the entire three-dimensionally shaping apparatus 100 may be placed in a high-pressure oxygen atmosphere.

The moving mechanism 203 moves the holding plate 202 in the vertical direction through the upper opening in the container 201. The moving mechanism 203 includes a pulse motor, a ball screw, and the like, and moves the holding plate 202 at an arbitrary speed or an arbitrary pitch under control of the controller 300. The following description sets the moving direction (vertical direction in the drawing) of the holding plate 202 by the moving mechanism 203 in FIG. 1 to a Z direction (thickness direction) and the direction orthogonal to the Z direction (lateral direction in the drawing) to an X direction. The direction orthogonal to the Z direction and the X direction (the depth direction in the drawing) is set to a Y direction. The moving mechanism 203 moves the holding plate 202 in an (upward) direction separating from the light transmitting plate 212 and in a (downward) direction for making the holding plate 202 closer to the light transmitting plate 212 in the Z direction. During shaping, the holding plate 202 is upwardly moved from the lower end position facing the dead zone DZ. When the image forming light is irradiated onto the UV curable resin RA through the light transmitting plate 212 while the holding plate 202 is located at the lower end position, a first shaped layer is formed and adhered to the holding plate 202. The next shaped layer is laminated and formed on the first shaped layer between the first shaped layer and the dead zone DZ by irradiating the image light onto the UV curable resin RA through the light transmitting plate 212 while the first shaped layer is lifted by a predetermined amount from the lower end position. This procedure can form a shaped object WB in which a plurality of shaped layers WA sequentially formed are laminated.

The projection unit 250 is disposed on the lower side of the container 201. The projection unit 250 includes a UV light source 251, a beam splitter 252, an image forming element 253 as a light modulation element, a driving mechanism 254, and a projection optical system 255. If necessary, another optical element for changing the projection optical path may be added to the projection unit 250.

The UV light source 251, the beam splitter 252, and the light modulation element 253 are arranged in series in the X direction as the horizontal direction. A projection optical system 255 is disposed above (in the Z direction) the beam splitter 252. The projection optical system 255 is disposed so that its light emitting surface faces the light transmitting plate 212.

The UV light source 251 emits the UV light and includes an LED, a high-pressure mercury lamp, or the like. The UV light emitted from the UV light source 251 passes through the beam splitter 252 and irradiates the image forming element 253 with the UV light.

Figure 2:
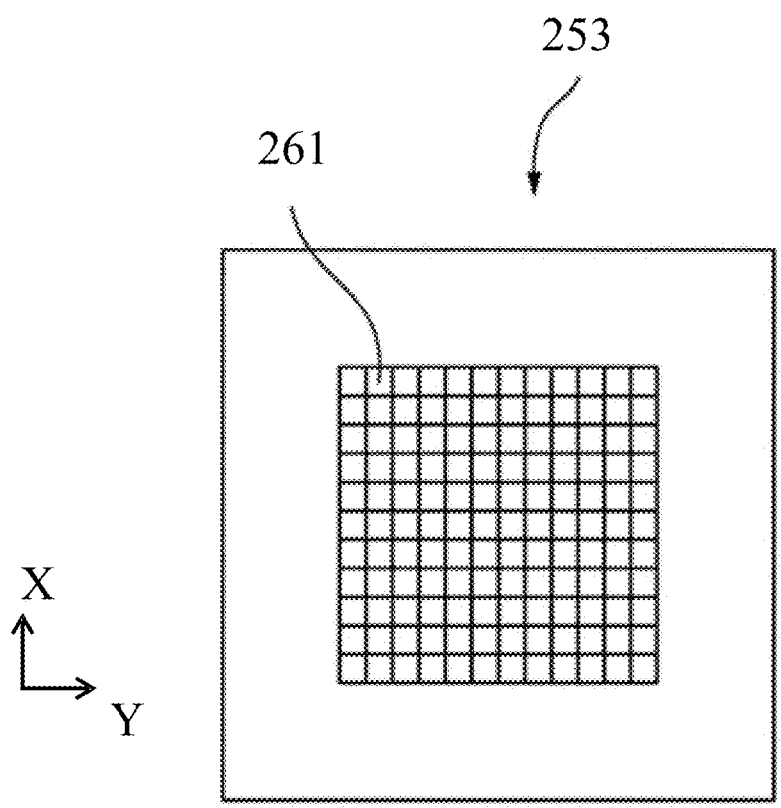
FIG. 2 is a view illustrating an image forming element used in the three-dimensionally shaping apparatus according to the first embodiment.

The image forming element 253 has a plurality of pixels, and modulates the irradiated UV light for each pixel to generate image light as modulation light. This embodiment uses a DMD (Digital Micro mirror Device) as the image forming element 253. As illustrated in FIG. 2, the image forming element 253 as the DMD includes a micro mirror in which each of the plurality of two-dimensionally arranged pixels 261 moves (rotates) between two angular positions (ON position and OFF position). Each pixel 261 can provide a binary control in which light and dark are expressed by the ON state where the mirror is located at the ON position and the OFF state where the mirror is located at the OFF position.

The image processing apparatus 400 generates a plurality of image data as two-dimensional shape data on a plurality of sections in the Z direction from previously prepared three-dimensional shape data as shape data of a three-dimensional object. Each image data is binary data including 1 indicating that it is a shaping pixel position or 0 indicating that it is a non-shaped pixel position for a plurality of two-dimensional pixel positions. The image processing apparatus 400 outputs to the controller 300 motion image data in which a plurality of image data are arranged in chronological order.

The controller 300 sequentially performs a binary control for each pixel 261 in the image forming element 253 based on each of the plurality of image data in the motion image data so that the UV light is modulated for each pixel 261 to generate the image light, as described above. The controller 300 can also perform a halftone control by a duty control that switches the ON state and OFF state of each pixel 261 at a high speed.

This embodiment describes the DMD used as the image forming element 253, but may use a reflection type liquid crystal panel or a transmission type liquid crystal panel as the image forming element 253. That illustration can also provide a halftone representation by high-speed switching of the reflectance or transmittance as well as the light and dark representation by the binary control over the reflectance or transmittance of a pixel. In addition, any element capable of forming the image light having light and dark or halftone can be used as the image forming element 253.

As described above, the beam splitter 252 transmits the UV light from the UV light source 251, and reflects the image light from the image forming element 253 toward the projection optical system 255. The projection optical system 255 includes one or a plurality of lenses, and projects (irradiates) the image light so that the image light from the image forming element 253 (the beam splitter 252) is imaged at a position optically conjugate with the image forming element 253 in the container 201. This embodiment sets the imaging position of the image light to the shaping position. The shaping position is a position just above the dead zone DZ in the container 201, and the shaped layer WA is formed when the shaped resin liquid layer PA located at the shaping position in the UV curable resins RA receives the image light. The shaped layer WA can be formed with a good resolution by imaging or making narrowest the image light from each pixel in the image forming element 253 at the shaping position.

The controller 300 controls the UV light source 251, the moving mechanism 203, the image forming element 253, and the driving mechanism 254 to instruct moving mechanism 203 to continuously or intermittently lift the holding plate 202 at a speed in synchronization with the formation (curing) of the shaped layer WA according to the above motion image. This configuration performs optical shaping so that the shaped object WB grows while its upper end is held by the holding plate 202.

Hence, the three-dimensionally shaping apparatus 100 according to this embodiment collectively projects the image light from the projection unit 250 to the shaping position in forming each of the plurality of sequentially laminated shaped layers WA and cures the shaped resin liquid layer PA at once. Therefore, the time required for shaping the shaped object WB becomes shorter than another apparatus that forms each shaped layer by scanning a laser beam or by applying the UV curable resin and by then irradiating light onto it.

The controller 300 is configured as a computer that includes a CPU 301, a RAM 302 having a work area used for a calculation in the CPU 301, and a ROM 303. The ROM 303 is a recording medium that records a program 304, and is a rewritable nonvolatile memory, such as an EEPROM. The CPU 301 executes a three-dimensionally or optically shaping process (manufacturing method) described later for controlling the shaping unit 200 by reading the three-dimensionally shaping program 304 as a computer program recorded in the ROM 303.

The three-dimensionally or optically shaping program 304 may be recorded in a non-transitory computer-readable storage medium, such as a nonvolatile memory (semiconductor memory or the like), a recording disk (optical disk or magnetic disk), and an external storage unit (hard disk drive).

FIG. 8A illustrates the light transmitting plate 212 in the shaping unit 200 in an ideal flat state (non-deflection state). When the light transmitting plate 212 is in the flat state, the dead zone DZ above it or the shaped resin liquid layer PA located at the shaping position facing the dead zone DZ also has a flat layer along the upper surface (flat surface) of the light transmitting plate 212. The shaped layer that is formed in this state as the image light is irradiated onto the shaped resin liquid layer PA also has a flat layer (including non-shaped portion).

Figure 8B:
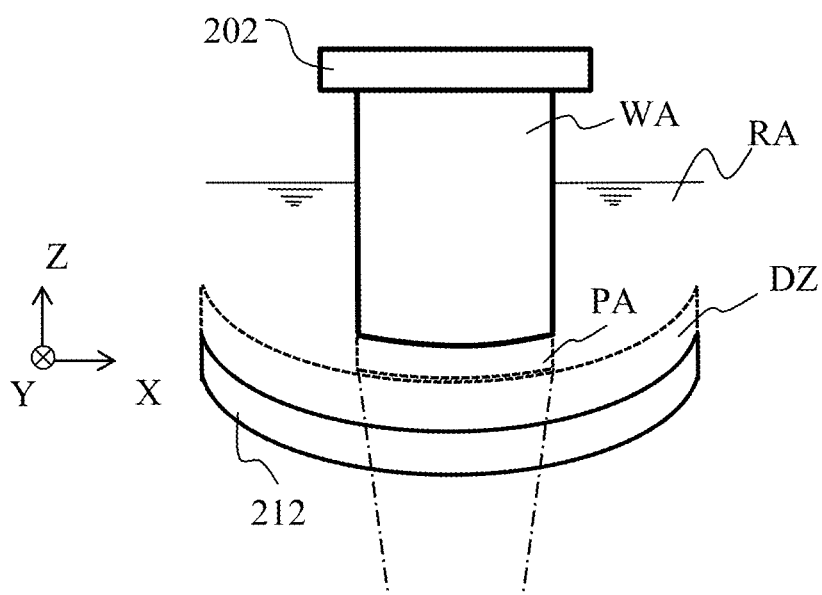

However, in reality, as illustrated in FIG. 8B, the light transmitting plate 212 deflects due to the weight of the UV curable resin RA stored in the container 201 and the own weight of the light transmitting plate 212. Further, the light transmitting plate 212 may deform due to the temperature rise of the apparatus 100. As a result, the dead zone DZ and the shaped resin liquid layer PA also distort along the top surface (curved surface) of the bent or deformed light transmitting plate 212. Since a conventional three-dimensionally shaping apparatus (referred to as a conventional apparatus hereinafter) collectively projects the image light onto the thus distorted shaped resin liquid layer PA at the same timing, the formed shaped layer WA also distorts.

Figure 9A:
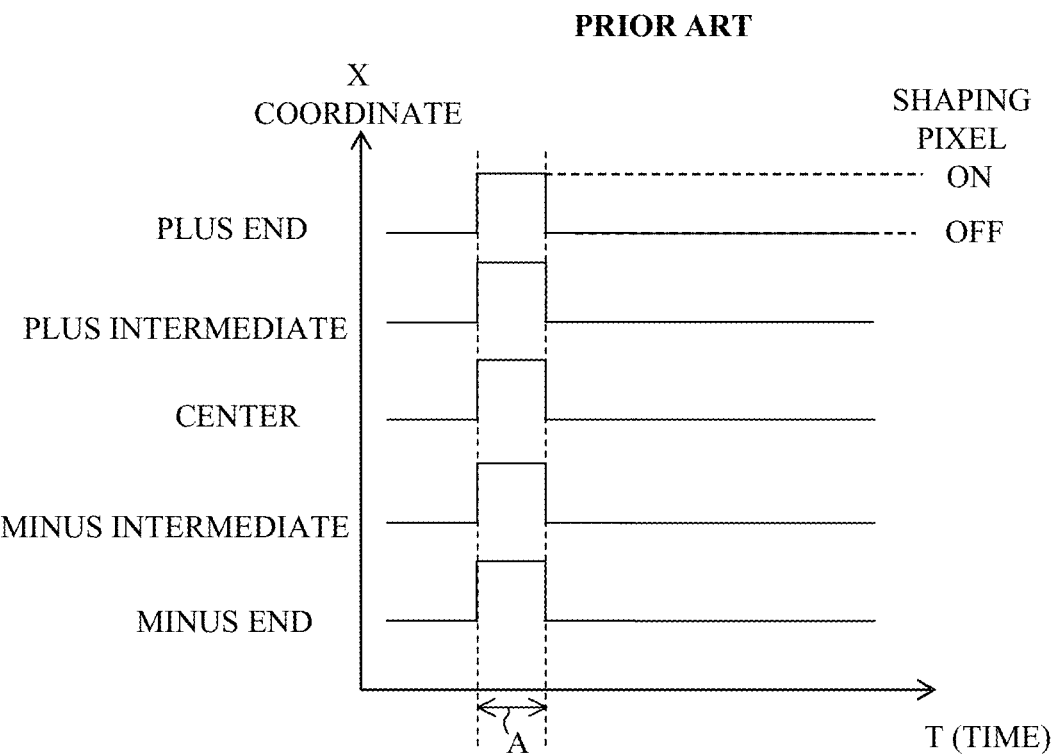
FIG. 9A is a timing chart illustrating ON and OFF timings of pixels in the image forming element in a conventional three-dimensionally shaping apparatus and FIG. 9B is a view of the shape of the shaped layer.

This will be described with reference to FIGS. 9A and 9B. FIG. 9A illustrates the irradiation timing of the image light for each X position (X coordinate) in the shaped resin liquid layer PA in the conventional apparatus or the ON timing at which the pixel (shaping pixel) corresponding to the X coordinate turns on in the image forming element 253. The shaped pixel which turns on at the ON timing turns off at the OFF timing after a predetermined irradiation time (pulse width) A elapses. The irradiation time A is a period necessary for the shaped pixel to switch in order of the OFF state, the ON state, and the OFF state or necessary for the image light (pulsed light) to be irradiated once, and the shaped layer is formed with a layer thickness corresponding to the irradiation time A of the once irradiation of the image light onto shaped resin liquid layer PA.

FIG. 9A illustrates all simultaneous ON timings of the shaped pixel corresponding to the five representative X coordinates or the center coordinate, the coordinates of both ends (plus and minus ends), and two (or plus and minus) intermediate coordinates between them. In addition to the five X coordinates illustrated in the figure, all the ON timings for the shaping pixels two-dimensionally distributed on the image forming element 253 are the same timings.

Figure 9B:
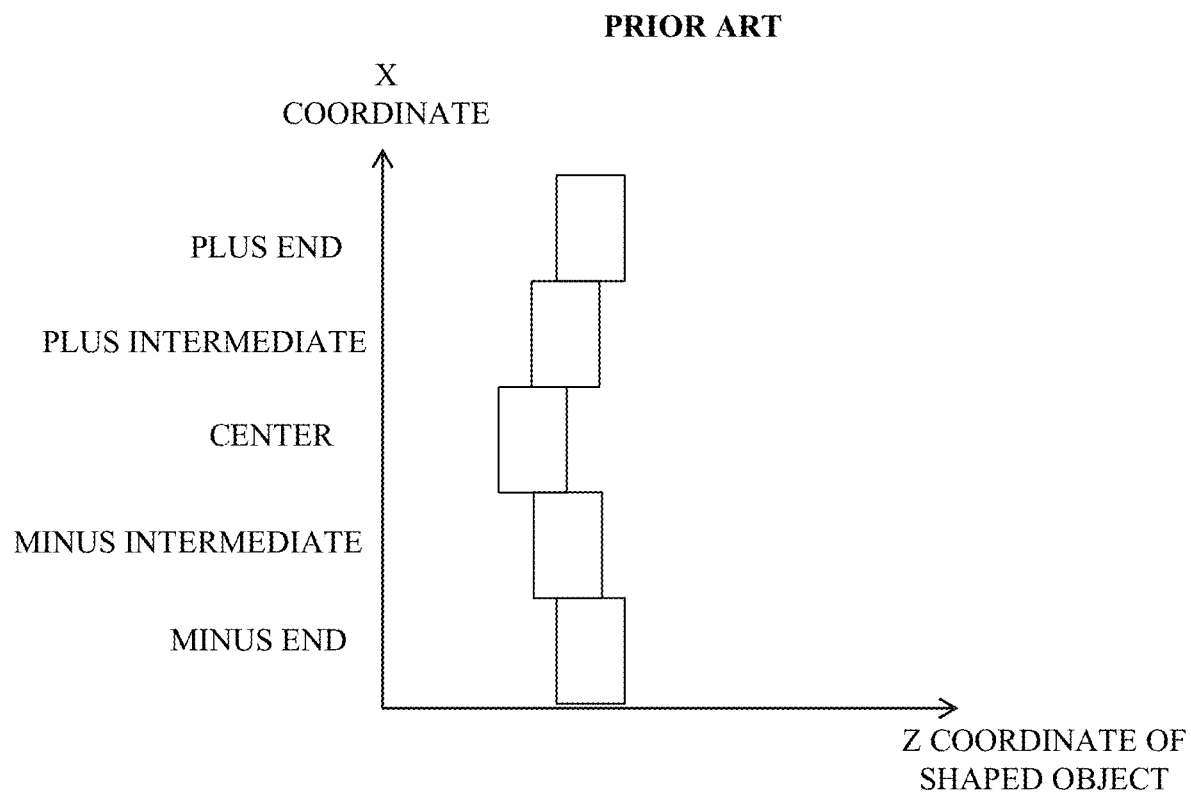

FIG. 9B illustrates the shape of the shaped layer when the ON timings illustrated in FIG. 9A are used. FIG. 9B illustrates that the shaped layer most significantly distorts at the center coordinate having the largest deflection amount of the light transmitting plate 212 among the five X coordinates, and the distortion reduces toward the coordinates of the both ends. In other words, the shaped layer distorts along with the distortion of the light transmitting plate 212. Thus, when the image light is irradiated onto the entire shaped resin liquid layer PA at the same irradiation timings with the deflecting light transmitting plate 212, a distorted shaped layer is formed from the original flat shape, and the good shaping accuracy cannot be obtained.

Accordingly, the three-dimensionally shaping apparatus according to this embodiment includes a storage unit 305 in the RAM 302 for storing an offset value for each pixel in the image forming element 253. Then, the controller 300 relatively offsets the ON timing (irradiation timing of the image light from the plurality of pixels) among the plurality of pixels according to the offset value read out of the storage unit 305. In other words, this embodiment makes the irradiation timing from at least part of the plurality of pixels different from the irradiation timing from another pixel. This configuration can reduce the distortion (referred to as a shaping distortion hereinafter) of the shaped object WB caused by the deflection of the light transmitting plate 212, and form the shaped object WB with a good shaping accuracy.

Figure 4A:
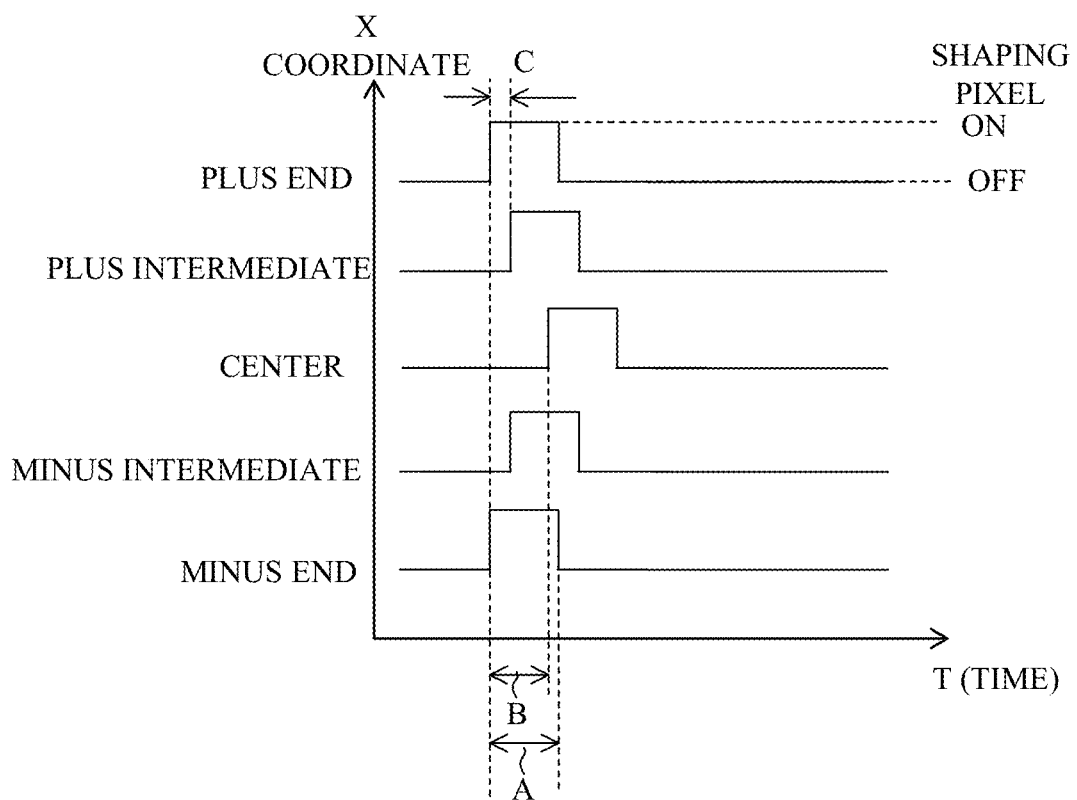
FIG. 4A is a timing chart illustrating ON and OFF timings of pixels in an image forming element according to the first embodiment and FIG. 4B is a view of a shape of a shaped layer.

FIG. 4A illustrates the ON timing corresponding to the five X coordinates (center coordinate, coordinates at both ends, and two intermediate coordinates) illustrated in FIG. 9A in the shaped resin liquid layer PA according to this embodiment. Even in this embodiment, the shaped pixel turning on at the ON timing is turned off at the OFF timing after the irradiation time A elapses as described in FIG. 9A.

FIG. 4A illustrates that the ON timing of the shaped pixel corresponding to the center coordinate is offset by the offset value B so that it is later than the ON timings of the shaped pixels corresponding to the coordinates at both ends. The ON timings of the shaped pixel corresponding to the two intermediate coordinates are offset so that they are later than the ON timings of the shaping pixels corresponding to the coordinates at both ends and earlier than the ON timing of the shaped pixel corresponding to the center coordinate. C represents an offset value of the ON timings of the shaping pixels corresponding to the intermediate coordinates relative to the ON timings of the shaped pixels corresponding to the coordinates at both ends.

The ON timings of all the shaping pixels two-dimensionally distributed on the image forming element 253 are offset according to the respective offset values, so that the ON timing of the shaping pixel corresponding to the center portion becomes later than that corresponding to the peripheral portion in the shaped resin liquid layer PA. In other words, the offset value of each shaping pixel is set so that the ON timing of the shaping pixel corresponding to the image light passing a first area having a large deflection amount (deformation amount) in the light transmitting plate 212 is later than the ON timing of the shaping pixel corresponding to the image light passing a second area having a small deflection amount.

Figure 4B:
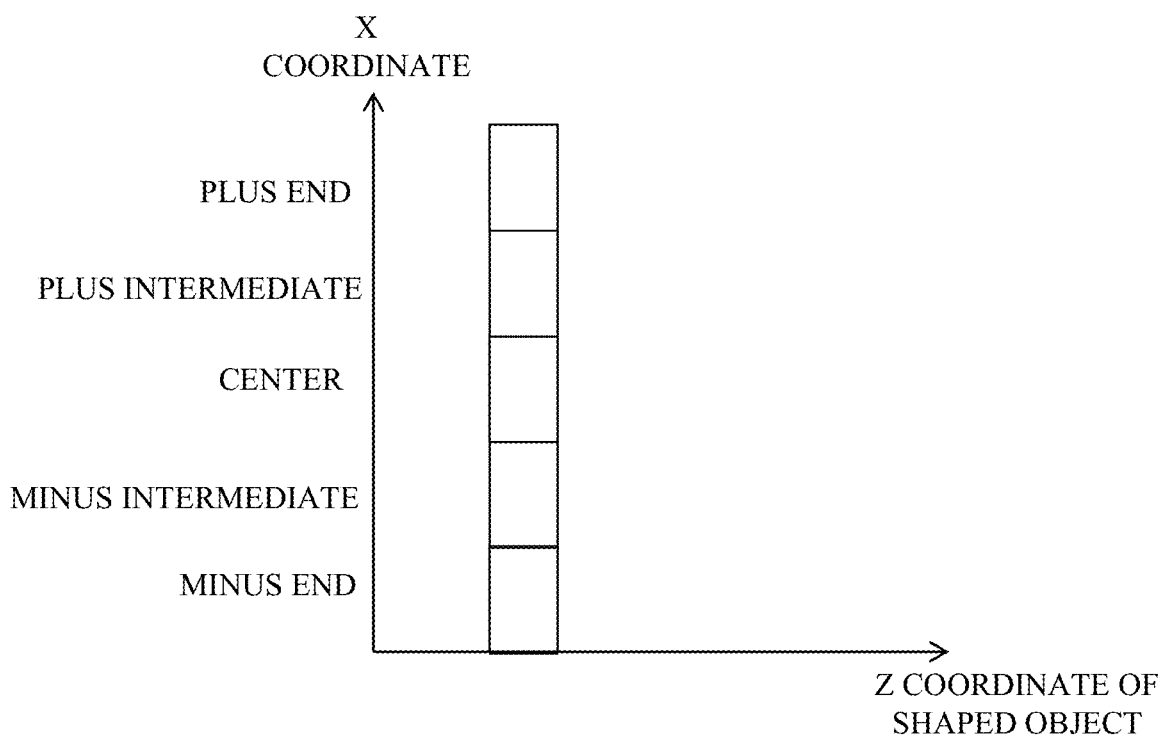

FIG. 4B illustrates the shape of the shaped layer when the ON timings illustrated in FIG. 4A are used. FIG. 4B illustrates that no distortion occurs in the above five X coordinates by offsetting the ON timing for each shaping pixel as illustrated in FIG. 4A. In other words, while the light transmitting plate 212 deflects, the shaped layer can be formed in a flat shape with a good shaping accuracy.

Figure 3:
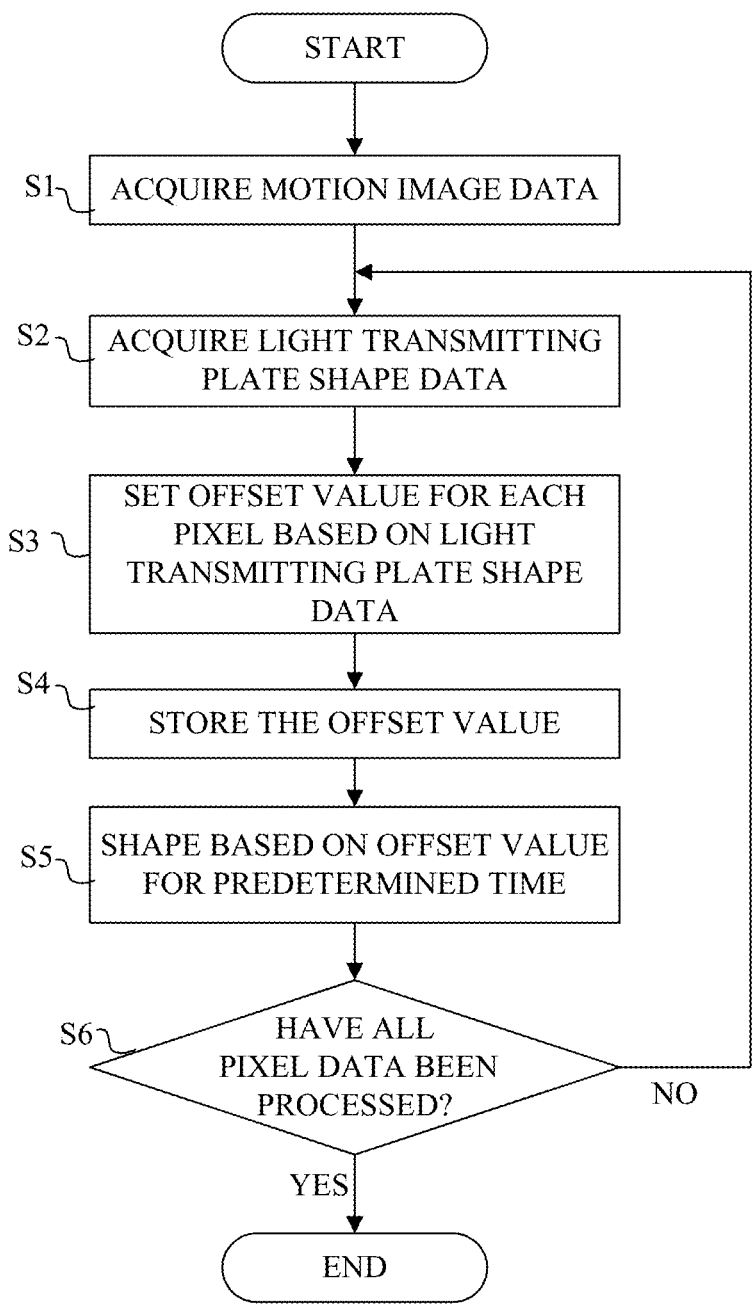
FIG. 3 is a flowchart illustrating a shaping process according to the first embodiment.

The flowchart in FIG. 3 illustrates a flow of a three-dimensionally shaping process executed by the CPU 301 in the controller 300 in accordance with the above three-dimensionally shaping program in this embodiment.

In the step S1, the CPU 301 acquires motion image data in which a plurality of image data are chronologically arrayed from the image processing apparatus 400.

Next, in the step S2, the CPU 301 irradiates detection light from a measurement light source 256 (different from the UV light in wavelength or) separate from the UV light source 251 onto the light transmitting plate 212 as illustrated in FIG. 1, and the detection light reflected on the light transmitting plate 212 is detected by a light receiving element (light detector) 257. Then, the CPU 301 acquires light transmitting plate shape data (information on the shape of the light transmitting plate 212) representing the shape (deflection) of the light transmitting plate 212 using the output from the light receiving element 257. In other words, the CPU 301 measures the shape of the light transmitting plate 212. The detection light may be an infrared ray to which the UV curable resin RA has no sensitivity. Thereby, the detection light does not affect the shaping of the shaped object.

This embodiment irradiates the infrared ray forming a two-dimensional pattern onto the light transmitting plate 212 from the detection light source 256, images the two-dimensional pattern formed on the light transmitting plate 212 through the light receiving element 257 as a two-dimensional image sensor, and analyzes the result to measure the shape of the light transmitting plate 212. Thereby, the shape of the light transmitting plate 212 can be measured in real time. However, as another method of measuring the shape of the light transmitting plate 212 may use, for example, a method of providing a plurality of laser interferometers and of measuring the relative position in the Z direction at each XY coordinate on the light transmitting plate 212. In addition, it may be measured using an interferometer, a probe contact method, a TOF method, or the like.

Next, in the step S3, the CPU 301 sets an offset value for each pixel for all two-dimensionally arranged pixels based on the acquired light transmitting plate shape data.

Next, in the step S4, the CPU 301 stores the set offset value for each pixel in the storage unit 305.

Next, in the step S5, the CPU 301 sequentially irradiates the image light corresponding to the plurality of image data contained in the motion image data onto the shaped resin liquid layer PA. In addition, the movement mechanism 203 is controlled so that the holding plate 202 is upwardly moved in synchronization with the irradiation of the image light corresponding to the image data. Then, the CPU 301 reads the offset values set for all pixels from the storage unit 305. In irradiating the image light corresponding to each image data (or the two-dimensional shape data on the same section), the ON timing of the shaped pixel to be the shaping position in each image data is controlled according to the offset value set for the shaped image. In other words, the ON timing or the irradiation timing of image light is controlled for each shaping pixel. Thus, the shaped object including the plurality of shaped layers is shaped for the predetermined time period.

Next, in the step S6, the CPU 301 determines whether the irradiation of the image light has been completed for all of the plurality of image data contained in the motion image data. If there is remaining image data, the flow returns to the step S2 and repeats the processing from the step S2 to the step S5 until the irradiation of image light for all image data is completed.

Herein, the temperature of the three-dimensionally shaping apparatus 100 may change due to the heat generated by the light curing in course of shaping of the shaped object and/or the temperature change of the space where the apparatus 100 is installed. Then, the deflection amount of the light transmitting plate 212 may change over time after the shaping starts. Accordingly, this embodiment repeats the processing from the step S2 to the step S4 at the above predetermined time intervals, and then provides shaping in the step S5. In other words, the CPU 301 measures the shape of the light transmitting plate 212 at predetermined time intervals in course of shaping, and changes the offset value for each pixel according to the shape change (information on the shape of the light transmitting plate 212) obtained by the measurement. This configuration can suppress the shape distortion from the start to the end of shaping.

This embodiment measures the shape of the light transmitting plate 212 at predetermined time intervals in course of the actual shaping, but may performs a shaping test before the shaping start or in manufacturing the three-dimensional shape apparatus 100, and stores in the storage unit 305 an offset value set based on the measurement result of the shape of the light transmitting plate 212. The ON timing for each shaping pixel may be controlled using the offset value stored in the storage unit 305 in the actual shaping.

Further, this embodiment irradiates the image light onto the UV curable resin once each from a first pixel and a second pixel among the plurality of shaping pixels based on the image data as the two-dimensional shape data on the same section. Now assume that the cured portions formed by the image light from the first pixel and the second pixel in the UV curable resin are a first curing portion and a second curing portion, respectively, and the thicknesses of the first and second cured portions in the Z direction separating from the light transmitting plate 212 (thickness direction) are set to a unit curing thickness. The controller 300 makes different the ON timing of the first and second pixels so that the position of the first cured portion and the position of the second cured portion in the Z direction have a smaller difference than the unit curing thickness.

In other words, the controller 300 controls the ON timings of the first and second pixels so that the ON timings of the first and second pixels has a time difference shorter than the once irradiation time A of the image light. That is, as illustrated in FIG. 4B, the ON timing of each shaping pixel is controlled so that the offset values (time differences) B and C are shorter than the irradiation time A. This configuration can suppress the shaping distortion smaller than the unit curing thickness.

In order to control the ON timing for each shaping pixel corresponding to a positional difference smaller than the unit curing thickness or a time difference shorter than the irradiation time, the DMD may be used for the image forming element 253. This is because the DMD can offset the ON and OFF timings for each pixel with a sufficiently fine resolution.

In addition, this embodiment sets the offset value according to the shape measurement result of the light transmitting plate 212 in course of shaping, but another offset value setting method may be used. For example, distortion calibrating three-dimensional shape data different from the three-dimensional shape data for the shaped object WB may be prepared, a calibration shaped object may be shaped, and an offset value may be set based on the shape measurement result of the calibration shaped object and stored in the storage unit 305. This configuration can suppress the shaping distortion through a simpler apparatus configuration by omitting the above measurement light source 256 and light receiving element 257.

Alternatively, the temperature of the three-dimensionally shaping apparatus 100 may be detected using a temperature sensor, and the offset value may be set based on the deflection amount of the light transmitting plate 212 according to the detected temperature.

Second Embodiment

Next follows a second embodiment according to the present invention. The basic configuration of this embodiment is the same as that of the first embodiment, and corresponding elements will be designated by the same reference numerals and a description thereof will be omitted.

Figure 5:
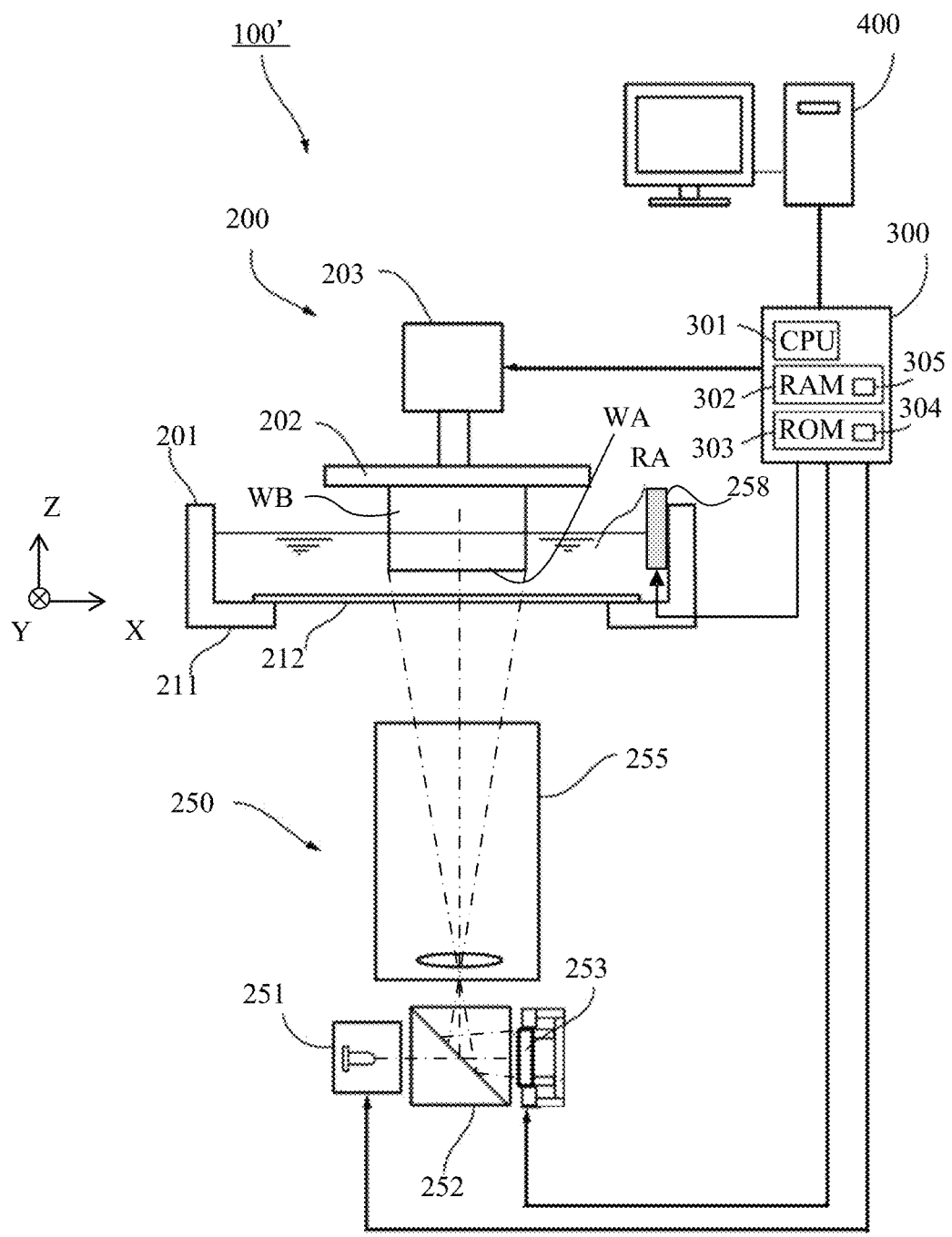
FIG. 5 is a view illustrating a configuration of a three-dimensionally shaping apparatus according to a second embodiment of the present invention.

FIG. 5 illustrates a configuration of the three-dimensionally shaping apparatus 100' according to this embodiment. The weight applied to the light transmitting plate 212 varies according to a liquid amount of the UV curable resin RA in the container 201, and as the liquid amount becomes larger and/or the weight becomes heavier, the deflection amount of the light transmitting plate 212 becomes larger. In addition, as the shaping of the shaped object WB proceeds and the liquid amount of the UV curable resin RA decreases, the weight reduces and the deflection amount of the light transmitting plate 212 reduces. Accordingly, this embodiment provides a liquid amount monitor (liquid amount detector) 258 configured to detect the liquid amount of the UV curable resin RA in the container 201, and changes the offset value for each shaping pixel according to the detected liquid amount data (information on the liquid amount).

The first embodiment directly measures the shape of the light transmitting plate 212. On the other hand, this embodiment measures the liquid amount of the UV curable resin RA, predicts based on the liquid amount the deflection amount of the light transmitting plate 212 caused by the weight of the UV curable resin RA, and sets the offset value. Therefore, the information on the liquid amount of the UV curable resin RA can also be considered to be information on the shape of the light transmitting plate 212.

Figure 6:
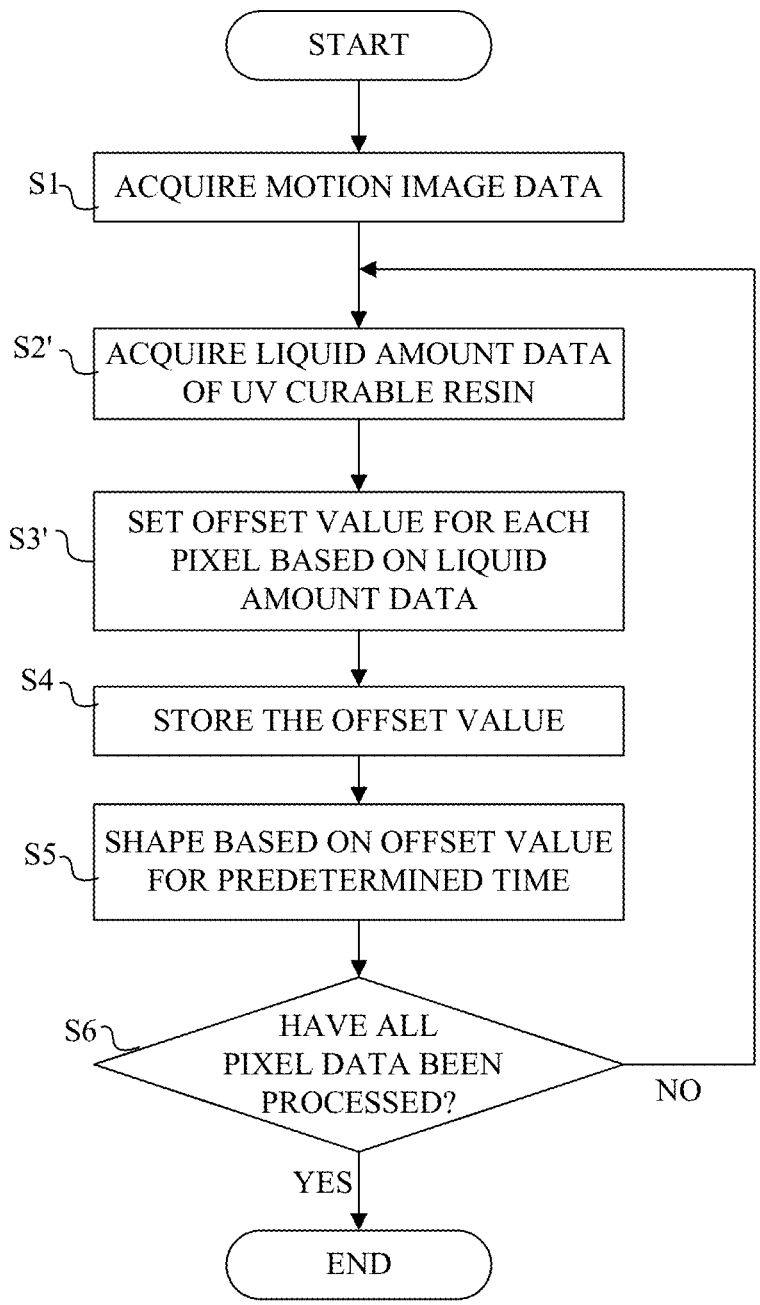
FIG. 6 is a flowchart illustrating a shaping process according to the second embodiment.

The flowchart in FIG. 6 illustrates a flow of a three-dimensionally or optically shaping process executed by the CPU 301 in accordance with the three-dimensionally shaping program in this embodiment. The step S1 and steps S4 to S6 in the flowchart of FIG. 6 are the same as those in the flowchart illustrated in FIG. 3 in the first embodiment.

In the step ST in FIG. 6, the CPU 301 acquires liquid amount data representing the liquid amount of the UV curable resin RA through the liquid amount monitor 258.

In the step 3', the CPU 301 calculates the weight of the UV curable resin RA based on the liquid amount data, and further calculates (predicts) the deflection amount of the light transmitting plate 212 based on the weight. Then, an offset value for each of all two-dimensionally arrayed pixels is set based on the calculated deflection amount. Thereafter, the flow proceeds to the step S4.

The deflection amount may not be calculated in the step S3'. In other words, a data table indicating the offset value for each liquid amount data may be previously stored in the storage unit 305, and an offset value corresponding to the liquid amount data acquired in the step ST may be read out of the data table.

Similar to the first embodiment, this embodiment can suppress the shaping distortion from the shaping start to the end with a configuration simpler than that of the first embodiment.

The first and second embodiments describe suppressing a shaping distortion caused by the deflecting light transmitting plate 212, but may suppress a shaping distortion caused by other causes by controlling the ON timing for each pixel. For example, a non-uniform oxygen permeability amount for each area in the X and Y directions on the transmission plate 212 varies the thickness of the dead zone DZ and consequently causes the shaping distortion. In this case, the offset value may be set using information (information on a gas permeability amount) obtained by measuring the oxygen permeability amount and oxygen permeability ratio for each area in the transmission plate 212. This can suppress the shaping distortion caused by the non-uniform oxygen permeability amount of the transmission plate 212.

In addition, where the moving direction of the holding plate 202 by the moving mechanism 203 inclines to the Z direction as a direction orthogonal to the light transmitting plate 212 (vertical direction in this embodiment), the inclination distorts in the shaped object. In this case, the inclination direction and inclination angle in the moving direction of the holding plate 202 from the direction orthogonal to the light transmitting plate 212 are measured. Then, the image forming element 253 sets an offset value for all pixels, which linearly changes in accordance with the inclination angle in the direction corresponding to the inclination direction, and thereby can suppress the inclination distortion of the shaped object.

Third Embodiment

The first and second embodiments describe the image light irradiated onto the UV curable resin RA in the container 201 through the light transmitting plate 212 provided at the bottom of the container 201 in the shaping unit 200. However, as in the shaping unit 200' according to a third embodiment of the present invention illustrated in FIG. 7A, the image light from the projection unit 250 may be irradiated onto the UV curable resin RA through the light transmitting plate 212 provided to a ceiling portion of the container 201'. In this case, the shaped layer WA may be sequentially formed by moving the holding plate 202' downwardly by the moving mechanism 203'.

Figure 7A:
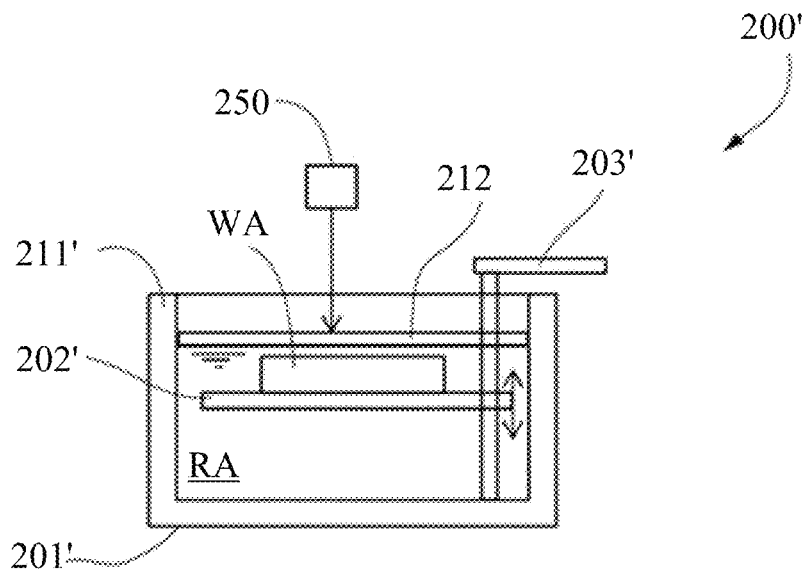
FIGS. 7A and 7B are views illustrating a three-dimensionally shaping apparatus according to a third embodiment of the present invention.
Figure 7B:
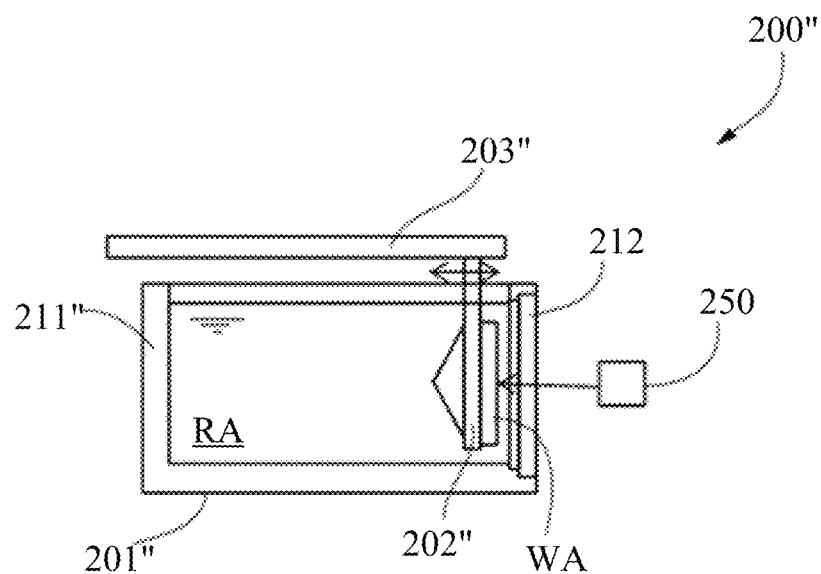

Further, as in the shaping unit 200" illustrated in FIG. 7B, the image light from the projection unit 250 may be irradiated onto the UV curable resin RA through the light transmitting plate 212 provided on a side surface portion of the container 201". In this case, the shaped layer WA may be sequentially formed while the moving mechanism 203" moves the holding plate 202" in the horizontal direction separating from the light transmitting plate 212.

Even in the configurations illustrated in FIGS. 7A and 7B, the shape of the light transmitting plate 212 deforms or the deflection amount varies due to the pressure received from the UV curable resin RA, the temperature of the apparatus, the own weight, or the like. Therefore, the three-dimensionally shaping process described in the first and second embodiments can suppress the shaping distortion.

Further, each of the above embodiments has described a dead zone formed by oxygen that has permeates through the light transmitting plate 212. However, a releasing agent (releasing layer) different from the UV curable resin RA may be provided between the UV curable resin RA and the light transmitting plate 212, or the container 201 (201', 201") may be micro vibrated so as to prevent the shaped layer from adhering to the light transmitting plate 212.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention controls the irradiation timing of the modulation light from the plurality of pixels in the light modulating element for the photocurable resin for each pixel, and can obtain good shaping accuracy even when the light-transmissive portion deflects or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optically shaping apparatus comprising:
    a container having a light-transmissive plate and configured to store a liquid photocurable resin;
    a light modulation element including a plurality of pixels and configured to modulate light from a light source for each pixel;
    an optical system configured to irradiate modulation light from the light modulation element onto the photocurable resin through the light-transmissive plate;
    a controller configured to control the light modulation element based on each of a plurality of two-dimensional shape data corresponding to a plurality of sections in a three-dimensional object; and
    a moving member configured to move a cured portion cured by the modulation light among the photocurable resin in a direction including a component orthogonal to a light-transmissive surface of the light-transmissive plate,
    wherein the controller is configured to control an irradiation timing of the modulation light onto the photocurable resin for each pixel to form the cured portion corresponding to the same section in the three-dimensional object, in accordance with information on a shape of the light-transmissive plate.

2. The optically shaping apparatus according to claim 1, wherein the controller is configured to control the irradiation timing so that the irradiation timing from at least part of the plurality of pixels is different from an irradiation timing from another pixel.

3. The optically shaping apparatus according to claim 1, wherein the controller changes the irradiation timing according to a change in the information on the shape of the light-transmissive plate.

4. The optically shaping apparatus according to claim 1, wherein the controller obtains the information on the shape of the light-transmissive plate by measuring the shape of the light-transmissive plate.

5. The optically shaping apparatus according to claim 4, further comprising:
   a measurement light source configured to emit detection light having a wavelength different from that of the modulation light; and
   a light detector configured to detect the detection light irradiated from the measurement light source onto the light-transmissive plate and reflected on the light-transmissive plate,
   wherein the controller measures the shape of the light-transmissive plate using an output from the light detector.

6. The optically shaping apparatus according to claim 1, wherein the controller controls the irradiation timing for each pixel according to information on a liquid amount of the photocurable resin.

7. The optically shaping apparatus according to claim 6, further comprising:
   a liquid amount detecting means configured to detect the liquid amount,
   wherein the controller acquires information on the liquid amount of the photocurable resin using an output from the liquid amount detecting means.

8. The optically shaping apparatus according to claim 1, wherein the controller is configured to control the irradiation timing of the modulation light passing a first area later than to the irradiation timing of the modulation light passing a second area when a deformation amount of the first area is larger than that of the second area in the light-transmissive plate.

9. The optically shaping apparatus according to claim 1, wherein the controller is configured to control the irradiation timing for each pixel according to information obtained by measuring an inclination of a moving direction of the moving member from a direction orthogonal to the light-transmissive plate.

10. The optically shaping apparatus according to claim 1, wherein the controller is configured to control the irradiation timing for each pixel according to information on at least one of a temperature of the optically shaping apparatus or a gas permeability amount of the light-transmissive plate.

11. The optically shaping apparatus according to claim 1, wherein:
   where the cured portions formed by irradiating the modulation light onto the photocurable resin once from a first pixel and a second pixel among the plurality of pixels based on the two-dimensional data on the same section are set to a first cured portion and a second cured portion, and thicknesses of the first cured portion and the second cured portion in a thickness direction as a direction separating from the light-transmissive plate are set to a unit curing thickness, and
   the controller is configured to control the irradiation timings from the first pixel and the second pixel differently from each other so that a position of the first cured portion and a position of the second cured portion in the thickness direction have a difference smaller the unit curing thickness.

12. The optically shaping apparatus according to claim 1, wherein where the modulation light is irradiated onto the photocurable resin once from a first pixel and a second pixel among the plurality of pixels based on the two-dimensional data corresponding to the same section, the controller controls the irradiation timings so that the irradiation timings of the modulation light from the first pixel and the second pixel are shorter than a single irradiation time of the modulation light.

13. A manufacturing method configured to manufacture a three-dimensional object, the manufacturing method comprising the steps of:
   storing a liquid photocurable resin in a container having a light-transmissive plate;
   irradiating modulation light from a light modulation element through the light-transmissive plate by controlling the light modulation element based on each of two-dimensional shape data corresponding to a plurality of sections in a three-dimensional object, the light modulation element including a plurality of pixels and being configured to modulate light from a light source for each pixel;
   moving a cured portion cured by the modulation light among the photocurable resin in a direction separating from the light-transmissive plate; and
   controlling an irradiation timing of the modulation light onto the photocurable resin for each pixel based on information on a shape of the light-transmissive plate to form the cured portion corresponding to the same section in the three-dimensional object.

* * * * *